(12) United States Patent
Matzkel et al.

(10) Patent No.: US 10,250,589 B2
(45) Date of Patent: Apr. 2, 2019

(54) SYSTEM AND METHOD FOR PROTECTING ACCESS TO AUTHENTICATION SYSTEMS

(75) Inventors: Ben Matzkel, Petach-Tikva (IL); Maayan Tal, Petach-Tikva (IL); Aviad Lahav, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 13/699,000

(22) PCT Filed: May 19, 2011

(86) PCT No.: PCT/IL2011/000398
§ 371 (c)(1),
(2), (4) Date: Nov. 20, 2012

(87) PCT Pub. No.: WO2011/145098
PCT Pub. Date: Nov. 24, 2011

(65) Prior Publication Data
US 2013/0067217 A1    Mar. 14, 2013

Related U.S. Application Data

(60) Provisional application No. 61/346,786, filed on May 20, 2010.

(51) Int. Cl.
*G06F 21/41* (2013.01)
*H04L 29/06* (2006.01)

(52) U.S. Cl.
CPC ............ *H04L 63/083* (2013.01); *G06F 21/41* (2013.01); *G06F 2221/2115* (2013.01); *H04L 63/0428* (2013.01)

(58) Field of Classification Search
CPC .................................................. H04L 63/0823
USPC .......................................................... 713/155
See application file for complete search history.

(56) References Cited

U.S. PATENT DOCUMENTS

| | | | | |
|---|---|---|---|---|
| 662,300 | A * | 11/1900 | Matthew Peter | 292/278 |
| 6,079,021 | A * | 6/2000 | Abadi | G06F 21/46 380/277 |
| 6,609,198 | B1 * | 8/2003 | Wood | G06F 21/31 713/155 |
| 6,735,310 | B1 * | 5/2004 | Hsing | G06F 21/31 380/28 |
| 6,874,085 | B1 * | 3/2005 | Koo et al. | 713/165 |

(Continued)

FOREIGN PATENT DOCUMENTS

GB          2349960          11/2000

OTHER PUBLICATIONS

International Search Report, dated Aug. 16, 2011 for PCT International Application No. PCT/IL2011/000398.

*Primary Examiner* — Kambiz Zand
*Assistant Examiner* — Thanh H Le
(74) *Attorney, Agent, or Firm* — Finnegan, Henderson, Farabow, Garrett & Dunner LLP

(57) ABSTRACT

A system and method for protecting access to authentication systems. A mediator may accept original authentication credentials from a client, may process the authentication credentials to provide processed authentication credentials and may forward the processed authentication credentials to an authentication system. Processing original authentication credentials may include encrypting at least one portion of original authentication credentials.

18 Claims, 4 Drawing Sheets

(56) References Cited

U.S. PATENT DOCUMENTS

| | | | | |
|---|---|---|---|---|
| 6,996,718 | B1* | 2/2006 | Henry | G06F 21/41 |
| | | | | 713/182 |
| 7,581,099 | B2* | 8/2009 | Ong | 713/170 |
| 7,681,037 | B2* | 3/2010 | Yoshida | H04L 63/08 |
| | | | | 380/278 |
| 7,890,643 | B2* | 2/2011 | Justus | H04L 63/0815 |
| | | | | 709/229 |
| 8,146,141 | B1* | 3/2012 | Grandcolas et al. | 726/5 |
| 8,255,696 | B2* | 8/2012 | Florencio | G06F 21/46 |
| | | | | 705/64 |
| 8,332,650 | B2* | 12/2012 | Banes | G06F 21/34 |
| | | | | 713/182 |
| 2001/0056409 | A1* | 12/2001 | Bellovin et al. | 705/64 |
| 2007/0168656 | A1* | 7/2007 | Paganetti et al. | 713/155 |
| 2008/0077809 | A1 | 3/2008 | Hayler et al. | |
| 2008/0276098 | A1* | 11/2008 | Florencio | G06F 21/46 |
| | | | | 713/183 |

\* cited by examiner

TOPOLOGIES

FIG. 2 PASSWORD SETTING

FIG. 3 INITIAL PASSWORD HANDLING IN THE MEDIATOR

CHANGING A USER'S PASSWORD BY AN ADMINISTRATOR

SYSTEM AND METHOD FOR PROTECTING ACCESS TO AUTHENTICATION SYSTEMS

CROSS-REFERENCE TO RELATED APPLICATIONS

This application is a National Phase Application of PCT International Patent Application No. PCT/IL2011/000398, International Filing Date May 19, 2011, entitled "SYSTEM AND METHOD FOR PROTECTING ACCESS TO AUTHENTICATION SYSTEMS", published on Nov. 24, 2011, as International Patent Publication No. WO 2011/145098, which claims priority from U.S. Provisional Patent Application No. 61/346,786, filed May 20, 2010, all of which being incorporated herein by reference in their entireties.

BACKGROUND OF THE INVENTION

In today's world, organizations use various different computer-based applications. Some of these computer applications offer authentication mechanisms in order to identify and control access to information. Using this set of applications brings about the challenge of managing a set of user identities of every user in every application. Typically, a human member of the organization would need to register separately in several authentication systems, providing a passphrase. This passphrase may later be used by these authentication systems to verify the user's identify in an authentication process.

In these types of environments, users tend to supply a single password, or slightly modified password, for every authentication system in use. Passwords need to be remembered by a human user, and consequently chosen passwords which are easy to remember are also weak or easy to guess by another party. Passwords thus become sensitive pieces of information, since if a password is compromised in a single authentication system, all other authentication systems immediately become compromised as well. This brings about the challenge of managing different passwords in different authentication systems.

Another issue is phishing attacks. In a phishing attack, an authorized entity (typically an impostor person) impersonates an authorized entity, and manipulates the user into giving away his or her password. After the user gives away the password, not only a single, authentication system becomes vulnerable, but all other authentication systems— that is, if the exposed password is similar in the other authentication systems. In order to make guessing user passwords more difficult for attackers and other unauthorized entities, some authentication systems enforce a password policy requiring the user to use a password of some minimal length, composed of characters from different character groups (for example, a password that must contain both letters and numbers), and possibly other requirements. Such strong or complex passwords are more difficult to guess.

SUMMARY OF EMBODIMENTS OF THE INVENTION

Embodiment of the invention may be used to protect and/or secure access to authentication systems. Embodiment of the invention may be used to protect and/or secure information stored in authentication systems. A mediator may accept original authentication credentials from a client, may process the authentication credentials to provide processed authentication credentials and may forward the processed authentication credentials to an authentication system or to a server. Processing original authentication credentials to provide processed authentication may include encrypting at least one portion of the original authentication credentials using a secret key and applying a keyed and non-reversible security transformation to at least one portion of the original authentication credentials. Processing original authentication credentials may include storing at least one of: a portion of the processed authentication credentials and a portion of the original authentication credentials at a storage system accessible to a mediator. Stored information may be encrypted using a at least one public key used in an asymmetric encryption scheme. Authentication credentials may include a user name, a password, a security question, a security answer and/or user email address. Processing original authentication credentials may be based on a user identity, a server identity, and/or secret information provided to a mediator.

A mediator may accept an original session parameter generated by a client or by a server, and may process the original session parameter to provide at least one processed session parameter. Processing an original session parameter may include encrypting the original session parameter using a secret key. The mediator may forward a processed session parameter to a client and/or to a server. A mediator may accept a processed session parameter, may process the processed session parameter to provide an original session parameter and may forward the original session parameter to a client and/or to a server.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

Figure 1:
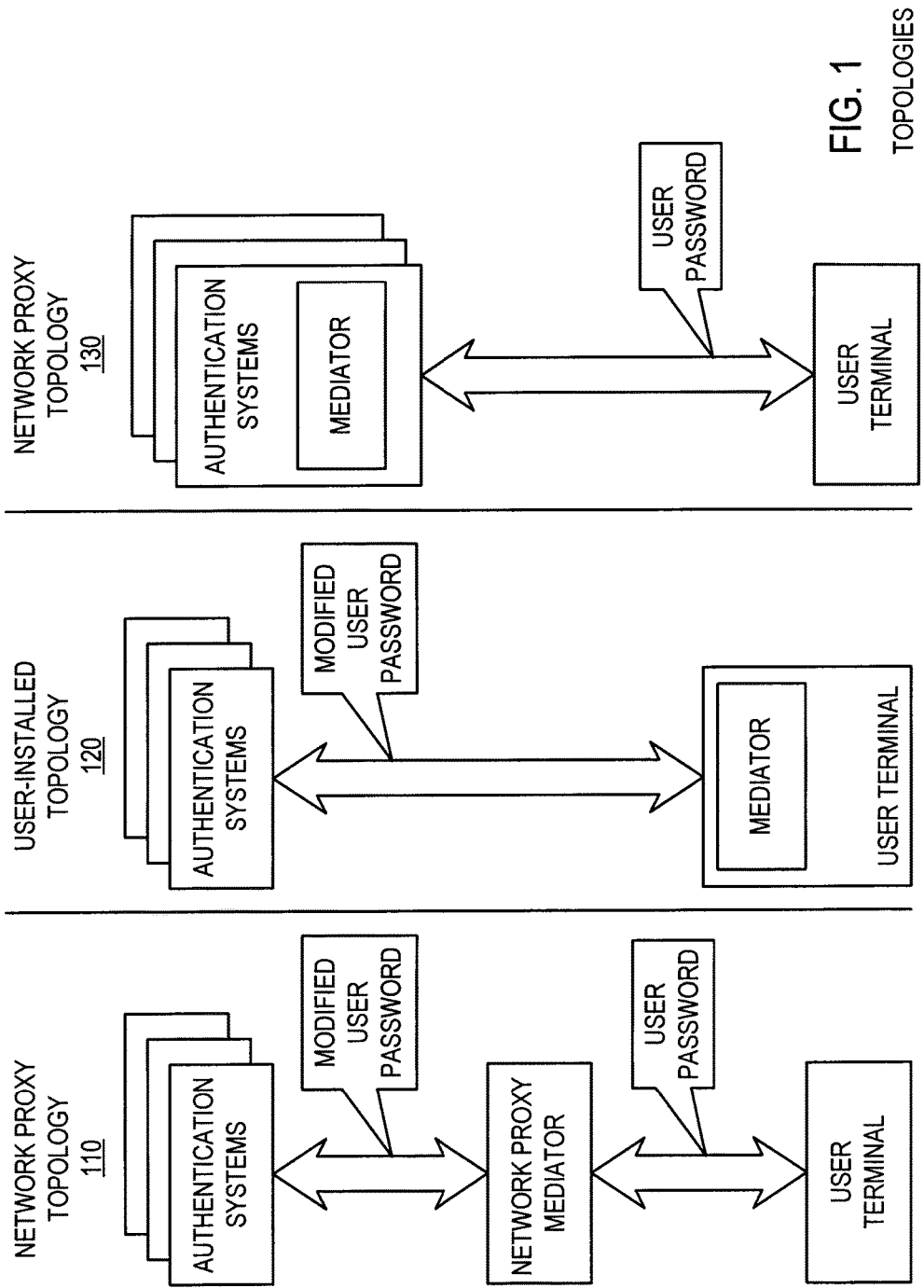
FIG. 1 shows a number of exemplary topologies according to embodiments of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

The present invention offers a system and method for systematically, automatically and consistently maintaining strong authentication protection by introducing a mediator between the user and the authentication system. A mediator may monitor and process user authentication credentials such as user names and passwords before they are sent to an authentication system. Embodiments of the invention may provide a means to enforce strong password policies with respect to the different authentication systems in use, while allowing a user to use simpler passwords.

Embodiments of the present invention may include a system and/or method for systematically, automatically and consistently maintaining strong authentication protection by introducing a mediator between the user and the authentication system. The mediator may monitor and process user authentication credentials such as user names and passwords before they are sent to the authentication systems. A mediator may provide means to enforce strong password policies with respect to a number of different authentication systems, while allowing the user to use relatively simple passwords and/or use a single password to authenticate the user with a number of different authentication systems or applications. Embodiments of the invention may generally include a user device or terminal, one or more authentication systems and a mediator. In some embodiments of the present invention, a mediator may be one or more computer network nodes adapted to receive network traffic from the user device and/or from one or more authentication systems.

Reference is made to FIG. 1 that shows a number of exemplary topologies according to embodiments of the invention. The present invention considers at least three parties: a user, an authentication system and a mediator. In some embodiments of the present invention, the mediator may be one or more computer network nodes adapted to receive network traffic from the user and/or from the authentication system, examine the traffic and possibly modify it (110). In another embodiment of the invention, the mediator may be located on the user's access terminal (120). In yet another embodiment, the mediator processes the user's data as part of the authentication system (130). Hereinafter, the authentication system being accessed may be termed the protected authentication system.

A mediator may include two portions located at different locations, with a first portion adapted to receive requests from a user, and a second portion adapted to receive responses from an authentication system. The presence of the mediator may not be known to a protected authentication system, a user, or both. The term "user" herein may refer to be a human user, an automated agent, or a human-driven user agent.

A mediator may process authentication credentials such as user name and password to provide processed authentication information. Production of processed authentication information by a mediator may depend on at least one of the following contextual parameters: (a) the identity of the user in the authentication system, (b) the identity of the user in the primary organizational authentication system, (c) the identity of the user in the mediator's authentication system, (d) the authentication system the user is trying to access, (e) information known only to the mediator, such as a secret encryption key or a secret hashing key. The information known only to the mediator may be affiliated with a user identity, with a protected authentication system, or a combination thereof.

Processing of authentication credentials to provide processed authentication information may include at least one of (1) replacing at least some of the authentication credentials with encrypted credentials using a reversible process such as a symmetric cipher using a private encryption key, (2) encrypting at least some authentication credentials to produce irreversible authentication credentials using an irreversible (or difficult to reverse) process such as cryptographic hash function (3) comparing the received authentication credentials to stored authentication credentials, (4) adding identification information to at least some of the authentication information such that it may be easy to detect a processed authentication information in a body of textual information, (5) encoding at least some of the processed authentication credentials in an encoding scheme required by the protected authentication system, (6) replacing at least some of the authentication credentials with other authentication credentials using a fixed mapping between unprocessed authentication credentials and processed authentication credentials, (7) performing symbol substitution on at least some of the authentication credentials; a symbol may be a character, a word, or any other segmentation process applied to authentication credentials to produce a sequence of symbols, (8) any other modification of at least some of the authentication credentials, (9) any of the processes 1-8 herein followed by or following adding the unprocessed authentication credentials to the processed authentication credentials. These processing steps may depend on the aforementioned contextual parameters and/or on other contextual parameters.

A system according to embodiments of the invention may choose to process different parts of the login credential differently. For example, the system may encrypt the password using a cryptographic hash function but encrypt the user name with a symmetric cipher and add identification information to so it may be later be detected and decrypted in a body of text.

Some authentication systems require a password to be composed of at least one character from a set of character groups. For example, an authentication system may require the password to contain lower case letters, upper case letters, numbers and punctuation characters, and to be longer than 6 characters. For this example, in one embodiment of the invention encoding the processed authentication information may include encoding an encrypted user name with base-64 encoding, encoding a hashed password with base-64 encoding, then adding the string "Aa!1" to the password so that the password policy requirements are always satisfied. Another embodiment will add only the characters from "Aa!1" whose character groups do not happen to appear in the processed hashed password. Any other text, data or parameter may be added to a generated password such that a rule, criteria or requirement (e.g., as dictated by an authentication system) may be met.

For example, one embodiment of the invention may take the user password and encrypt it using a symmetric cryptographic cipher such as AES or Blowfish. The key used for the encryption may vary, depending on the identity of the user in one or more authentication systems, and possibly on the authentication system being accessed. In another embodiment, the user password may be processed using a cryptographic hash function such as SHA-1 or MD5. The consequence of using such a function instead of a symmetric cipher may be that the password is practically impossible to recover even if the private encryption key is compromised.

Another embodiment may use both cryptographic hash functions and symmetric ciphers, depending on contextual factors such as the protected authentication system. For example, a certain authentication system might send the processed password to the user in case it is forgotten. In such event, the system may monitor data flows containing the processed password (such as email messages), and may decrypt data before it reaches the user. Another authentication system might never send the processed password to the users, and thus a system according to embodiments of the invention may take a more secure approach and encrypt the password in an irreversible fashion. Another embodiment may store processed passwords in a storage system, e.g., a database, a central database, a remote server, or some sort of network directory, which may be accessible to a mediator that may retrieve stored processed passwords from a storage system when a processed password is required.

Figure 2:
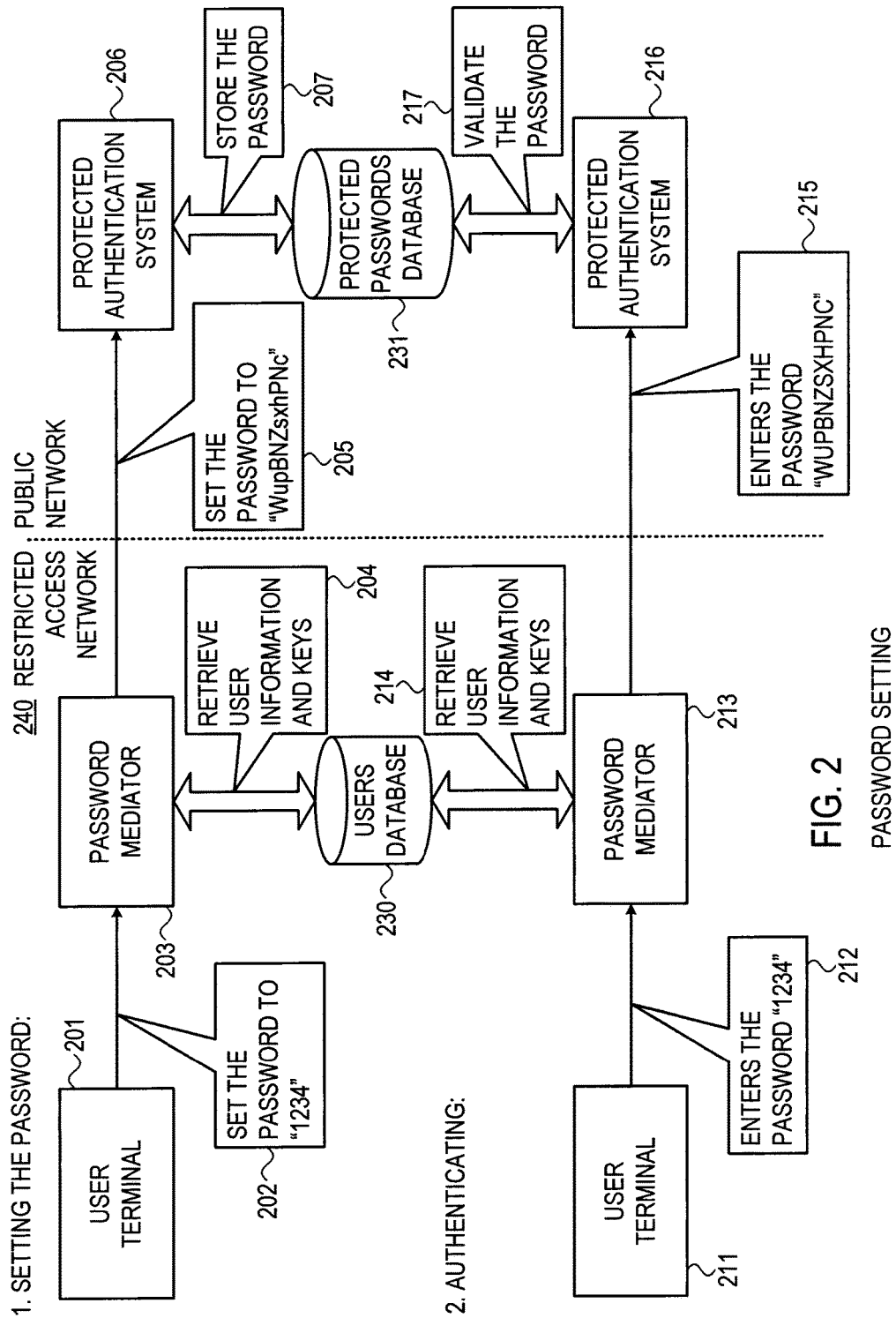
FIG. 2 shows a schematic block diagram of flows according to embodiments of the invention.

Reference is made to FIG. 2 that shows a schematic block diagram of exemplary data flows according to embodiments of the invention. When first registering a user with an authentication system, a first password may be provided (202) by the user (201) for authenticating the user with that authentication system. The system may then process (203) the password to generate or obtain a first processed password, possibly by consulting a user database (230) to retrieve user information and private keys (204), and may send the processed password (205) to the authentication system (206) instead of the original first password. The processed first password may then be stored (207), possibly in an irreversible form, in the authentication system being accessed (231). Later, the user (211) may access the protected authentication system (216) to perform user authentication. The user may enter the plaintext password (212) at a client terminal, and the password is meant to be sent to the protected authentication system. Before the password reaches the protected authentication system, the mediator (213) may retrieve user information and keys (214), may process the password, and may replace the plaintext password with a processed password (215). When the second processed password reaches the protected authentication system (216), it is validated against the first processed password (217) and the user login may be verified. Since the mediator may be located in a restricted access network (240), only the user may request password mediation.

Some authentication systems may sometimes generate a user's password and provide it to the user, for example just after registering a new user with that authentication system. A system according to embodiments of the invention may detect that the user password is changed without the system's knowledge by at least one of (a) not having a record of any previous authentication attempt of said user to the protected authentication system, (b) a failed authentication to a protected authentication system using authentication credentials assumed to be valid by the mediator, (c) a successful authentication to a protected authentication system using authentication credentials assumed or determined to be invalid by the mediator.

When authentication credentials are detected as changed without the system's knowledge, the system may not process authentication credentials and may forward the authentication credentials without modification to the protected authentication system. After a successful authentication attempt mediated by the system, the system may decide to process the successfully authenticated credentials for the authenticated user in the protected authentication system.

Processing successfully authentication credentials may include at least one of (a) generating a new encryption key to be used in credentials encryption, (b) processing the successfully authenticated credentials to provide processed authentication credentials, (c) storing at least some of the successfully authenticated credentials or of the processed authentication credentials in a storage system, (d) storing at least some of the successfully authenticated credentials or the processed authentication credentials in a storage system, encrypted with at least one public key belonging to a body or entity who may need to obtain the credentials later. This body or entity may be an administrator, a password changing computer system, the authenticated user, or another party.

Figure 3:
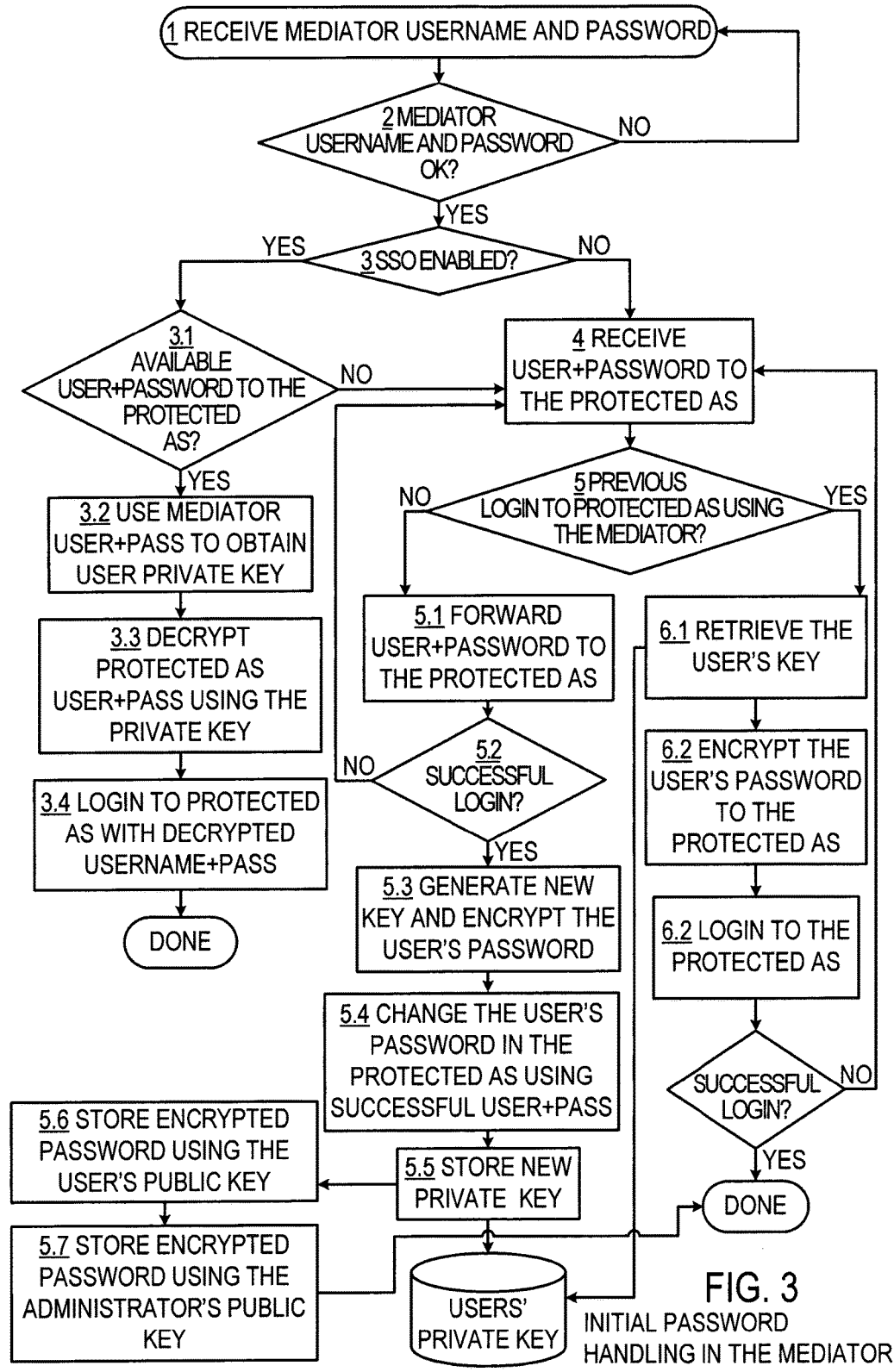
FIG. 3 is a flowchart describing a method according to embodiments of the invention.

Reference is made to FIG. 3 that shows a flowchart describing a method according to embodiments of the invention. FIG. 3 illustrates how a user password may be processed by the mediator during initial and subsequent authentications to a protected authentication system (the "protected AS"). As shown in FIG. 3, A mediator may receive a username and a password from a user, for the mediator (1). The mediator may check the username and password for validity. If the validity check fails, the flow may returns to 1 (2). The flow may include determining if Single-Sign-On (SSO) is enabled (3), if so, the operations 3.1 to 3.4 may be performed:

The mediator may try to retrieve a username and password to a protected authentication system for the user (3.1). If retrieval of a username and a password is unsuccessful, the flow may proceed to 4 (3.2). If retrieval of a username and a password is successful, the mediator may retrieve the user's private key, retrieves the encrypted authentication credentials, and may decrypt them (3.3). The mediator may perform a login to the authentication system using the decrypted credentials (3.4) and the flow may terminate.

As shown by 4, if SSO is not enabled, the mediator may receive a username and a password from a user, for a protected authentication system (4). As shown by 5, the flow may include determining whether the user has never yet been authenticated to the protected authentication system using the mediator, if so, the operations 5.1 to 5.7 may be performed (5):

If The mediator may forward the protected authentication system's username and password to the authentication system (5.1). If the authentication system does not accept the user and password, the flow may return to 4 (5.2). The mediator may generate a new encryption key for the user in the protected authentication system, and may encrypt the user's password to the authentication system (5.3). The mediator may change the password in the authentication system using the validated username and password (5.4). The mediator may store the new encryption key (5.5). The mediator may store the new password and username for later retrieval, encrypted with the user's public key (5.6). The mediator may store the new password and username, encrypted with an administrator's public key (5.7).

If the user has already been authenticated to the protected authentication system through the mediator then operations 6.1 to 6.3 may be performed:

The mediator may retrieve the user's encryption key (6.1) The mediator may encrypt the user's password to the authentication system using the retrieved key, and may forward it to the authentication system (6.2). As shown, if the login is successful, the flow may terminate, otherwise the flow may return to 4.

When the user changes his or her password while working with the mediator, the mediator may produce a processed password in the same manner previous passwords were processed, taking into account the various contextual parameters mentioned above. In one embodiment, passwords may be changed at time of the user's login. The mediator may obtain the login credentials and may use them to request a password change from the protected authentication system in a background process. Changing the password may include one or more of (1) generating a new encryption key for encrypting the password and storing it on a storage system accessible to the mediator, (2) changing the password stored on a storage system accessible to the mediator.

In order to support password changing triggered by an administrator, the system may store the user login credentials, including password and username, locally on the mediator or in a storage system accessible to the mediator. The login credentials may be stored in an automatically recoverable fashion, such as on an encrypted disk, in plaintext, or encrypted with an encryption key which is always available. This way, the mediator may change the protected password at all times. Optionally, user's login credentials may be stored encrypted using an asymmetric cipher, using an administrator's public key, on a storage system. Later, the administrator may decrypt login credentials of one or more users to one or more protected authentication systems, and thus may be able to request the protected authentication systems to change a user's password using the decrypted login credentials. The computer system performing the decryption and/or password changing may be the mediator itself or another computer system trusted by the administrator.

Figure 4:
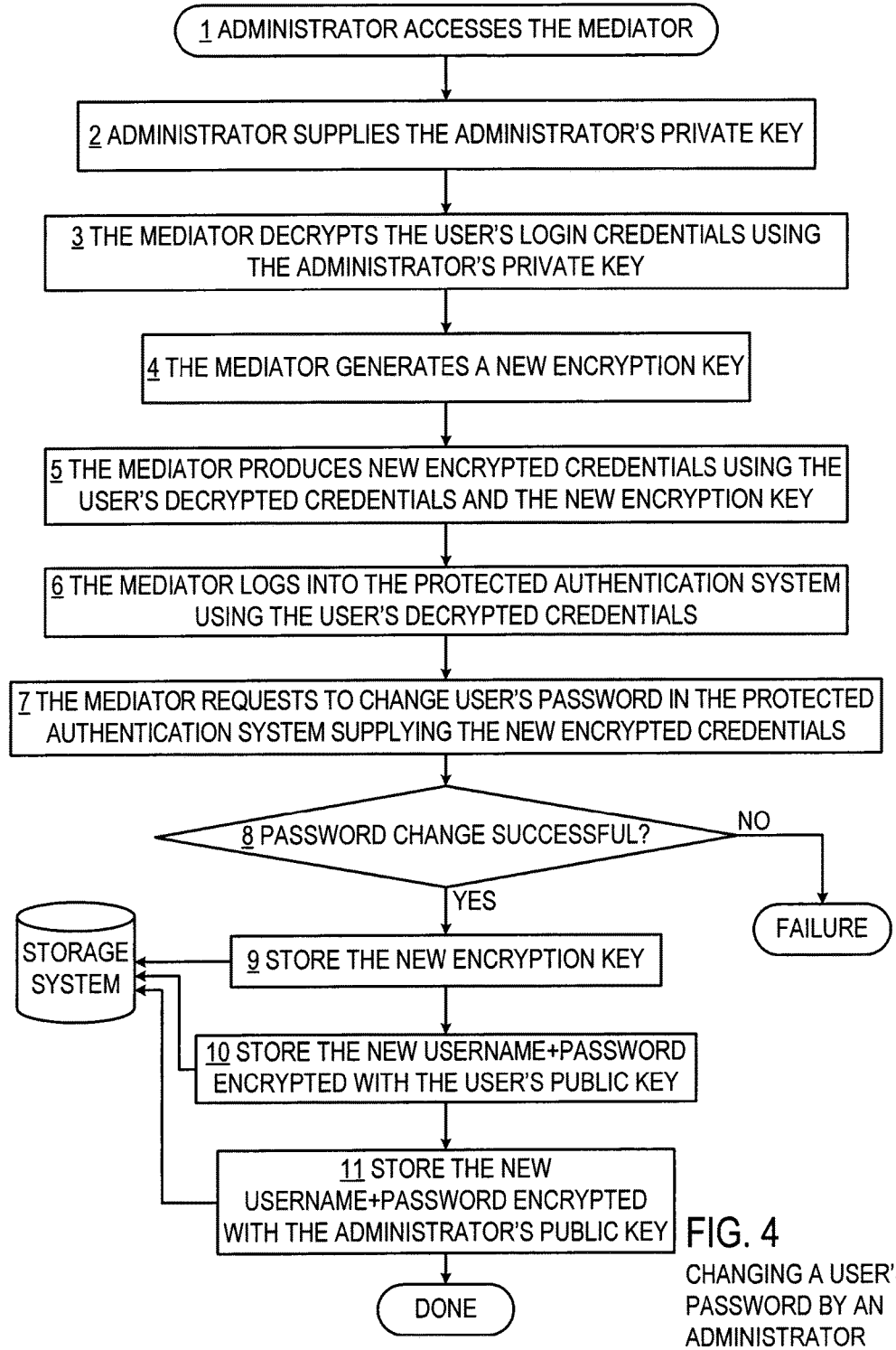
FIG. 4 is a flowchart describing a method according to embodiments of the invention.

Reference is made to FIG. 4 that shows a flowchart describing a method according to embodiments of the invention. In particular, FIG. 4 shows how password changing may be performed when initiated by an administrator. As shown, in an exemplary flow or method, an administrator may access the mediator requesting changing of user's password in the protected authentication system (1). The administrator supplies a private key for decrypting user credentials for a protected authentication system (2). The mediator decrypts the user's login credentials to the protected authentication system (3). The mediator generates a new encryption key for the new encrypted password (4). The mediator produces new encrypted credentials using the user's decrypted credentials and the new encryption key (5). Using the decrypted user's credentials, the mediator logs into the protected authentication system (6). Using the decrypted user's credentials, the mediator requests the authentication system to change the user's password on his or her behalf to the new encrypted credentials (7). If the password change has been successful (8), the mediator stores the new encryption key (9), and the new user and password encrypted with the user's and administrator's public key (10, 11)

Two basic cases may be distinguished: (a) Second factor of authentication—where a user needs to present authentication credentials to a protected authentication system and additionally to a second authentication system, and (b) Transparent login to a protected authentication system, also known as Single-Sign-On (SSO). Here, authentication to a protected authentication system can be automatically performed after presenting user credentials to a second authentication system. The second authentication system, in both cases, may be an organizational system such as Active Directory, or a custom authentication system supplied as part of the authentication mediator.

In an embodiment of the present invention, the first case, termed second factor of authentication, is enabled, supported or provided. A user may be asked to supply authentication credentials to the mediator. These credentials may then be used to create an authenticated session identifying the user. In one embodiment, the authenticated session may be an HTTP cookie sent to a web browser. In another embodiment, the authenticated session may be marking the user's IP network address as authenticated. The session then may expire and the user may be asked again for authentication credentials. Once the user is authenticated with the mediator, the user may proceed to login into a protected authentication system. The protected authentication system authentication credentials may include a password which may be processed by the mediator as described above. Thus the system may make the user supply two different user credentials to both the mediator and the protected authentication system.

Optionally, the user's credentials are automatically sent to the mediator after being authenticated in another authentication system, such as an Active Directory system deployed in the organization's network. Optionally, the user includes the authentication credentials to the mediator in the actual authentication credentials sent to the protected authentication system through the mediator. The mediator then may extract from the combined credentials two separate credential sets, one for authentication to the mediator and one for authenticating to the protected authentication system.

For example, when accessing an authentication system using XML SOAP API, the system may receive from a user (1) a string comprising of a mediator username, followed by a space character, followed by a username in the protected authentication system; and (2) a string comprising of a mediator password for the mediator username, followed by a space character, followed by a password in the protected authentication system. In one embodiment of the present invention, the second case termed SSO is provided. The system stores the user's login credentials to a protected authentication system on a storage system accessible to the mediator. When the user accesses a protected authentication system, only authentication credentials to the mediator may be received by the mediator. The mediator then may retrieve, from the storage system, the stored user's login credentials to the protected authentication system being accessed. Then the protected authentication system may receive these retrieved credentials from the mediator, and may authenticate the user.

Optionally, the mediator may store the login credentials to the protected authentication system on a storage system accessible to the mediator, encrypted with a user's public key of an asymmetric cryptographic cipher. When authenticating to the mediator, the mediator may retrieve a respective private key dependent on the user's successful authentication. The mediator may then proceed to retrieve the stored encrypted user credentials, decrypt them using the retrieved private key, and use them to authenticate to the protected authentication system on behalf of the user.

When a user authenticates to an authentication system, an authenticated session is typically created. All subsequent communication between the user and any service managed by the authentication system needs to be authenticated as well. This service is called the protected service hereinafter. This authenticated session is meant to identify this session as valid without requiring the user to supply authentication credentials every time he or she tries to access such a service. The system may monitor and possibly intervene in the authenticated session. The mediator may modify all or part of authentication information used subsequently to identify the authenticated session before it is received by either the user or the protected service or authentication system.

For example, some protected services such as Internet web sites manage authenticated sessions by sending an HTTP cookie to a web browser user agent. The user agent then sends this HTTP cookie to the server whenever a request to the web site is made. The mediator may process a first HTTP cookie sent from the browser to provide a processed HTTP cookie, and then forward the processed cookie to the browser. In subsequent requests made by the user agent, the mediator may receive the processed HTTP cookie, and process it to provide the first HTTP cookie. Then the mediator may forward the first HTTP cookie to the web server.

The processing of a first authentication information sent from a protected service to provide a processed authentication information may include at least one of (a) storing the first authentication information in a storage system or device, possibly with additional information such as the time of the request, (b) encrypting the first authentication information with a key accessible to the mediator using a symmetric cipher, (c) adding to the first authentication information additional information, such as the identity of the user in the mediator, (d) adding identification information so it is possible to distinguished processed from unprocessed authentication information, (e) digitally signing the first authentication information such that it is possible to verify the authenticity of the processed authentication information, and prevent any unauthorized body from generating a processed authentication information.

Processing of the processed authentication information sent from a user to a protected service may include at least one of (a) decrypting the processed authentication information, (b) verifying the digital signature of the authentication information, (c) retrieving from a storage system or device information about the processed or unprocessed authentication information, (d) removing any additional information previously added to the initially unprocessed authentication information, (e) removing any identification information previously added to the initially unprocessed authentication information.

Optionally, the system may enable termination of an authenticated session. The mediator may decide to, or be requested to, terminate a current authenticated session. The mediator may then terminate the session according to the type of authentication information processing applied to the current authenticated session. For example, when the session mediation is done by tracking the network IP address of the client, the mediator may block any traffic from that recognized IP address until the user authenticates again to the mediator or to the protected authentication system. Another example is session mediation by setting an HTTP cookie for the DNS domain of a protected authentication system. The mediator may send the user a request to erase the cookie, or it may mark the issued cookie as invalid and block access to the site until the user authenticates again.

Some authentication systems receive from a user a security answer, and possibly a security question. The security answer and question provide alternative authentication credentials to be used when the password is forgotten. The mediator may mediate communications where security questions and answers appear, and may process either or both of the question and answer when received from the user. Processing the security question may include any of the processing options applied in processing of authentication credentials as described above, and may additionally include non-deterministic encryption using cryptographic salt. Processing the security answer may include any of the processing options applied in processing of authentication credentials as described above, and may additionally include normalization of the security answer into a canonical form, such as converting all characters to lowercase before encrypting or hashing.

Some authentication systems let users request specify an e-mail address for purpose of sending authentication-related messages. These messages may include a user's forgotten authentication credentials such as a password and/or username. These messages may also include a URI the user can access and use it to prove his or identity. That URI may in turn provide the user with the existing password and/or other authentication credentials, or may let the user change his or her password or other authentication credentials.

A system according to embodiments of the invention may process these email addresses to provide a processed e-mail address which the system may intercept using a mail transfer agent (MTA). These email addresses may be encrypted or otherwise processed so that the original address can be recovered from the processed address. Other processing may include storing the original address in a storage system accessible to the MTA. Processing may occur in the mediator while mediating communication between the authentication system and the user. The system may then include an MTA adapted to receiving email messages destined to a user. This MTA may then recover the original address from the processed address, and may process the email message by (a) detect any processed authentication credential occurring in the message, (b) recover the unprocessed authentication credential from the processed authentication credential, (c) replace the detected processed authentication credential with the recovered authentication credential in the message, (d) forward the message to the recovered unprocessed email address.

The system may generate logging events to record user logins. An administrator or an auditor can access the event log to view and analyze events at a later time. The system may offer an administrator the ability to do at least one of (a) revoke a certain user's password from a certain authentication system, (b) revoke a user's access to all protected authentication systems, (c) disable all users' access to a certain site. Revocation includes at least one of (c.1) permanently disable the user (c.2) permanently disable the password in use, forcing the user to change the password. (d) Monitor authentication activity, (e) view a selection of authentication events according to arbitrary criteria, for example (e.1) an authentication event into a protected system using credentials different from a user's previous authentication attempts to the protected authentication system; or (e.2) a user's login into a protected authentication system using credentials belonging to another user.

Embodiments of the invention, e.g., a mediator as described herein, may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. Some embodiments, e.g., a mediator as described herein, may be provided in a computer program product that may include a non-transitory machine-readable medium, stored thereon instructions, which may be used to program a computer, or other programmable devices, to perform methods as disclosed herein.

The storage medium may include, but is not limited to, any type of disk including optical disks, rewritable compact disk (CD-RWs) and the like. The storage medium may include semiconductor devices such as read-only memories (ROMs), random access memories (RAMs), such as a dynamic RAM (DRAM), flash memories or any type of media suitable for storing electronic instructions, including programmable storage devices. A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a workstation, a server computer, a network device or any other suitable computing device.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of enhancing security of authentication credentials for an authentication system, the method comprising:
   receiving original authentication credentials from an identity requesting access to a first protected service managed by the authentication system;
   generating a first authentication information based at least on i) the original authentication credentials, ii) a first encryption key that depends on at least one password requirement of the authentication system managing the first protected service, iii) the identity requesting access to the first protected service, and iv) an identity associated with the first protected service; and
   forwarding the generated first authentication information to the authentication system managing the first protected service.

2. The method of claim 1, further comprising encrypting at least a portion of the first authentication information wherein the encrypting includes:
   substituting at least one portion of the original authentication credentials with mapped credentials.

3. The method of claim 1, wherein generating the first authentication information further comprises at least one of:
   encoding the first authentication information using at least one character taken from a plurality of character groups, each said character group required by the authentication system managing the first protected service to be included in the first authentication information; and
   encoding the first authentication information using an encoding allowing for detection of the first authentication information in a body of text.

4. The method of claim 1, wherein generating the first authentication information further comprises storing at least one of:
   a portion of said first authentication information, and
   a portion of said original authentication credentials in a storage system,
   wherein the stored information is encrypted using at least one public key used in an asymmetric encryption scheme.

5. The method of claim 4, wherein the stored original authentication credentials are decrypted using a private key corresponding to said at least one public key.

6. The method of claim 1, wherein said original authentication credentials include at least one of: a user name, a password, a security question, a security answer and a user email address.

7. The method of claim 1, wherein generating the first authentication information is based on at least one of: a user identity recognized by said mediator, a user identity recognized by said access-controlled resource, a server identity, and secret information.

8. The method of claim 1 further comprising:
   receiving a request from the identity to access a second protected service managed by a second authentication system that is different from the authentication system managing the first protected service;
   generating a second authentication information based at least on i) the original authentication credentials, ii) a second encryption key that is different from the first encryption key, iii) the identity requesting access to the second protected service, and iv) an identity associated with the second protected service; and
   forwarding the generated second authentication information to the second authentication system managing the second protected service.

9. One or more non-transitory computer-readable storage media comprising instructions for enhancing security of authentication credentials for any access-restricted resource, the instructions being executable to cause one or more processors to:
   receive original authentication credentials from an identity requesting access to a first protected service managed by the authentication system;
   generate a first authentication information based at least on i) the original authentication credentials, ii) a first encryption key that depends on at least one password requirement of the authentication system managing the first protected service, iii) the identity requesting access to the first protected service, and iv) an identity associated with the first protected service; and
   forward the generated first authentication information to the authentication system managing the first protected service.

10. The one or more non-transitory computer-readable storage media of claim 9, where the instructions when executed further cause the one or more processors to:
    encrypt at least a portion of the first authentication information wherein the encrypting includes substituting at least one portion of the original authentication credentials with mapped credentials.

11. The one or more non-transitory computer-readable storage media of claim 9, wherein generating the first authentication information further comprises at least one of:
    encoding the first authentication information using at least one character taken from a plurality of character groups, each said character group required by the authentication system managing the first protected service to be included in the first authentication information; and
    encoding the first authentication information using an encoding allowing for detection of the first authentication information in a body of text.

12. The one or more non-transitory computer-readable storage media of claim 9, wherein the first authentication information further comprises storing at least one of:
    a portion of said first authentication information, and
    a portion of said original authentication credentials in a storage system,
    wherein the stored information is encrypted using at least one public key used in an asymmetric encryption scheme.

13. The one or more non-transitory computer-readable storage media of claim 9, wherein the stored original authentication credentials are decrypted using a private key corresponding to said at least one public key.

14. The one or more non-transitory computer-readable storage media of claim 9, wherein said original authentication credentials include at least one of: a user name, a password, a security question, a security answer and a user email address.

15. The one or more non-transitory computer-readable storage media of claim 9, wherein generating the first authentication information, is based on at least one of: a user identity recognized by said mediator, a user identity recognized by said access-controlled resource, a server identity, and secret information.

16. The one or more non-transitory computer-readable storage media of claim 9, wherein the instructions when executed further cause one or more processors to:
    receive a request from the identity to access a second protected service managed by a second authentication system that is different from the authentication system managing the first protected service;
    generate a second authentication information based at least on i) the original authentication credentials, ii) a second encryption key that is different from the first encryption key, iii) the identity requesting access to the second protected service, and iv) an identity associated with the second protected service; and
    forward the generated second authentication information to the second authentication system managing the second protected service.

17. A method of enhancing security of authentication credentials for an authentication system, the method comprising:
    receiving from an identity a request to access a protected service managed by the authentication system;
    generating authentication information based at least on: i) the identity requesting access to the protected service, ii) an identity associated with the protected service; and iii) an encryption key associated with the authentication system managing the protected service; and
    forwarding the generated authentication information to the authentication system.

18. One or more non-transitory computer-readable storage media comprising instructions for enhancing security of authentication credentials for any access-restricted resource, the instructions are executable to cause one or more processors to:
    receive from an identity a request to access a protected service managed by the authentication system;
    generate an authentication information based at least on:
    i) the identity requesting access to the protected service, ii) an identity associated with the protected service; and iii) an encryption key associated with the authentication system managing the protected service; and
    forward the generated authentication information to the authentication system.

* * * * *